T. E. BISSELL.
HORIZONTAL ADJUSTABLE DRAFT CONNECTION FOR DISK HARROWS.
APPLICATION FILED NOV. 5, 1920.
1,388,160. Patented Aug. 23, 1921.
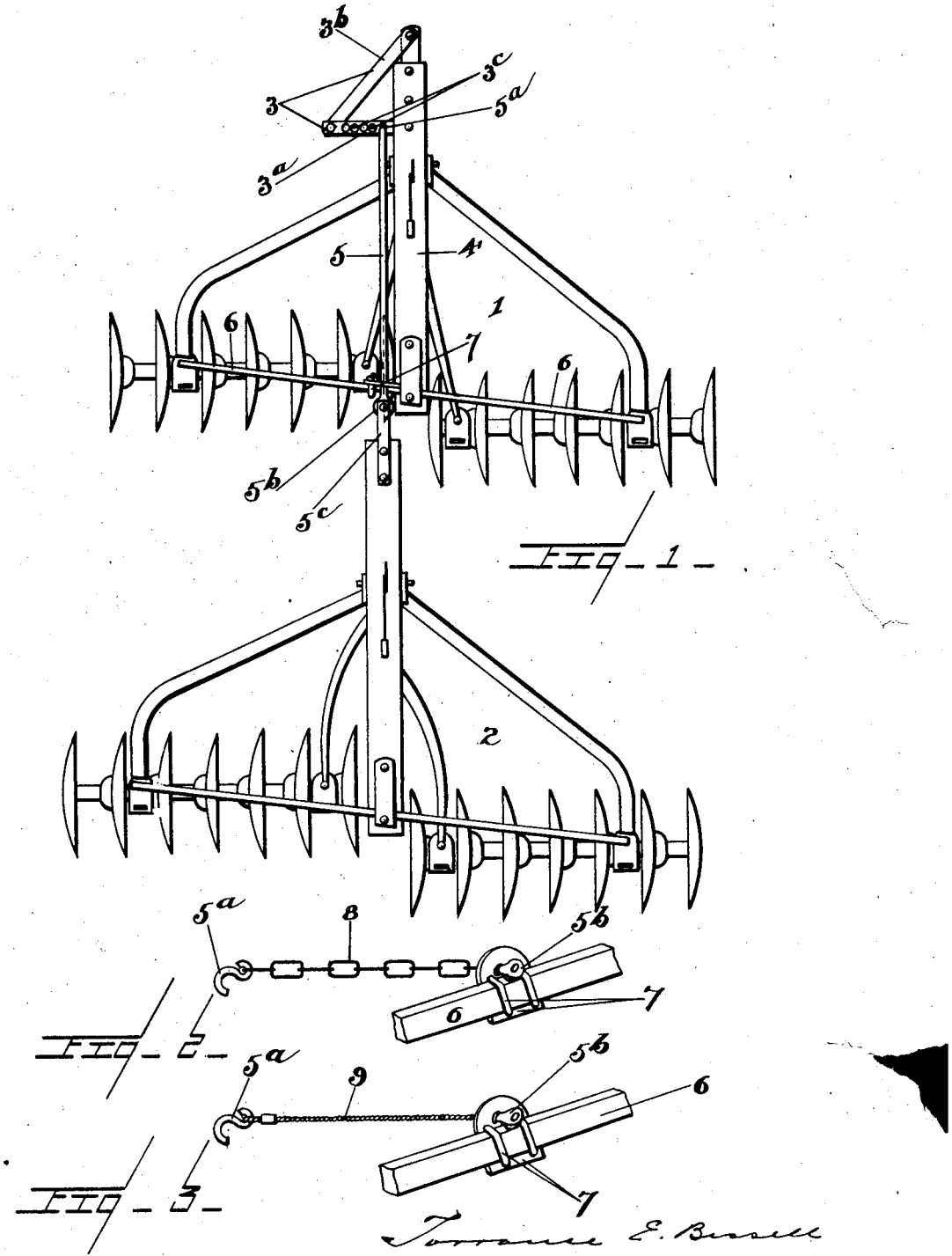

UNITED STATES PATENT OFFICE.

TORRANCE EDWARD BISSELL, OF ELORA, ONTARIO, CANADA.

HORIZONTAL ADJUSTABLE DRAFT CONNECTION FOR DISK HARROWS.

1,388,160.  Specification of Letters Patent.  Patented Aug. 23, 1921.

Application filed November 5, 1920. Serial No. 421,927.

*To all whom it may concern:*

Be it known that I, TORRANCE EDWARD BISSELL, a British subject, residing in the town of Elora, in the county of Wellington and Province of Ontario, Dominion of Canada, have invented certain new and useful Improvements in Horizontally-Adjustable Draft Connections for Disk Harrows; and I hereby declare the following to be a full, clear, and exact description of the same.

The invention forming the subject matter of my United States Patent No. 1331229, dated the 17th of February 1920, consists of tandem disk harrows in which the rear unit is pivotally attached to the draft point of the front unit with suitable provision for its lateral adjustment.

My present invention relates to a modification of that construction, and it consists essentially of an element, which may take the form of a clevis, extending laterally from the pole near the draft point of the front unit, and a draft member having a laterally adjustable attachment with said clevis, and with the frame of the front unit, to which is coupled the rear unit, as hereinafter set forth and particularly pointed out in the claims.

In the drawings:

Figure 1, is a plan view of a tandem disk harrow constructed according to this invention, showing a draw bar used as the draft member, and Figs. 2 and 3, are detail views showing a chain and a cable respectively substituted for the draw bar shown in Fig. 1.

Like numerals refer to like parts throughout the specification and drawings.

The front unit 1 and rear unit 2, forming the tandem harrow, are of any well-known construction, and coupled together by the improved draft connection forming the subject matter of this invention.

This draft connection comprises, as shown in Fig. 1, a clevis or draft element 3 secured to one side of the pole 4, at or near the draft point, consisting, as shown in Fig. 1, of an arm $3^a$ extending horizontally at right angles from and secured at its inner end to the pole, and an arm $3^b$ integrally formed with or secured to the outer end of the arm $3^a$ and to the pole.

The arm $3^a$ is formed with a series of apertures $3^c$ for the lateral adjustment of the front end of the draft member 5, which as shown in Fig. 1, consists of a draw bar having at its forward end a hook or offset $5^a$ to enter any selected aperture $3^c$ in the clevis, and having at its rear end an eye $5^b$ for pivotal connection with the rear unit. The draft member is of a length to extend from the clevis beyond the yoke or frame 6 of the front unit, to which it is adjustably secured by a suitable clip 7. This arrangement provides for the lateral adjustment of the rear end of the draft member within practical operating range.

The rear unit is pivotally connected by means of a clevis $5^c$ or other suitable connecting medium with the eye $5^b$, which permits of the vertical and lateral play of the rear unit independently of the front unit and preserves the operating efficiency of both units, the lateral adjustment of the draft connection providing for and maintaining the correct position of the rear unit, relatively to the front one.

In Figs. 2 and 3 are shown draft members consisting of a chain 8 and a cable 9 respectively, the front end of each of which may be laterally adjustably connected with the clevis, and the rear end of each of which may be laterally adjustably connected with the yoke or frame of the front unit.

Having thus fully described my invention, what I claim as new and desire to secure by Letters Patent is:

1. A draft connection between units of a tandem disk harrow, comprising a draft member, the front end of which has a laterally adjustable connection with the front unit and the rear end of which has a pivotal connection with the rear unit, and means laterally adjustably holding the rear end of the draft member to the frame of the front unit for the pivotal attachment of the rear unit.

2. A draft connection between units of a tandem disk harrow comprising a draw bar, having at its rear end a pivotal connection with the rear unit and at its front end a laterally adjustable connection with the front unit, and means laterally adjustably holding the rear end of the draft member to the frame of the front unit for the pivotal attachment of the rear unit.

3. A draft connection between units of a tandem disk harrow comprising a clevis secured to the front unit, a draft member having at its front end a laterally adjustable connection with said clevis, and at its rear end a laterally adjustable connection with the frame of the front unit, for the pivotal attachment of the rear unit.

4. A draft connection between units of a tandem disk harrow comprising a clevis extending laterally from the pole of the front unit near the draft point, a draft member having at its rear end a pivotal connection with the rear unit, and at its front end a laterally adjustable connection with said clevis, and means laterally adjustably holding the rear end of the draft member to the frame of the front unit for the pivotal attachment of the rear unit.

5. A draft connection between units of a tandem disk harrow comprising a clevis extending laterally from the front unit near the draft point, a draft member having at its rear end a pivotal connection with the rear unit, and having at its front end a laterally adjustable connection with said clevis, and a shiftable clip embracing the draft member and the frame of the front unit and coöperating with the clevis for the lateral adjustment of the draft member for the pivotal attachment of the rear unit.

6. In combination with the front and rear units of a tandem disk harrow, a draft connection comprising a draft member arranged lengthwise of the harrow, a clevis extending laterally from the front unit near the draft point, said clevis having a plurality of apertures for the attachment of the draft member and its lateral adjustment, and a shiftable clip embracing the draft member and the frame of the front unit coöperating with the clevis for the lateral adjustment of the draft member for the pivotal attachment of the rear unit.

Elora, Ontario, September 30, 1920.

TORRANCE EDWARD BISSELL.

Signed in the presence of—
 HAROLD ARTHUR,
 LLOYD E. BISSELL.